Feb. 9, 1943.                E. NORRMAN                    2,310,706
APPARATUS FOR COMPARING THE RATES OF REGULARLY RECURRING IMPULSES
                    Filed April 16, 1941          3 Sheets-Sheet 1
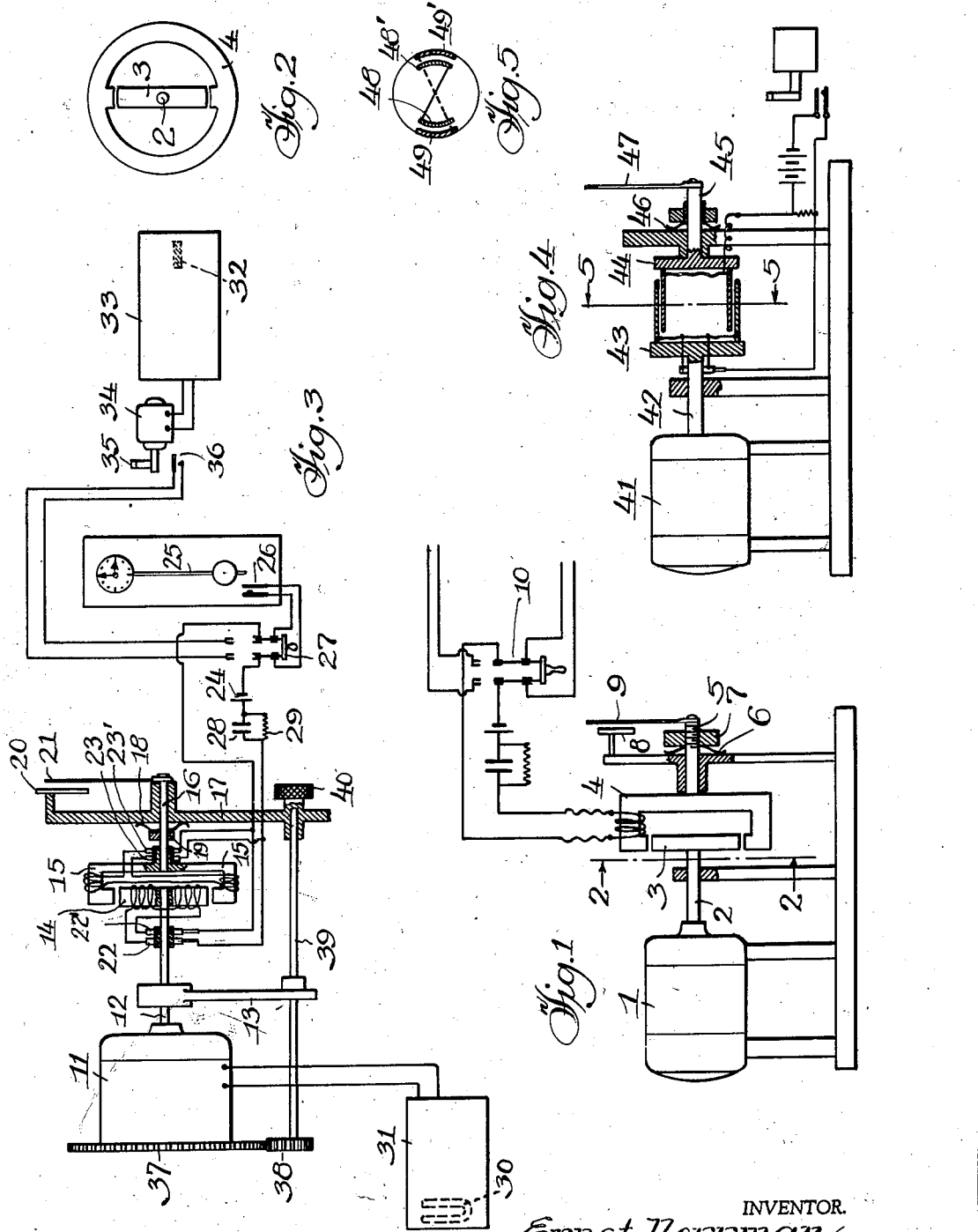
INVENTOR.
Ernst Norrman
BY
Critton, Wiles, Davies & Hirschl, Attys.
Witness:

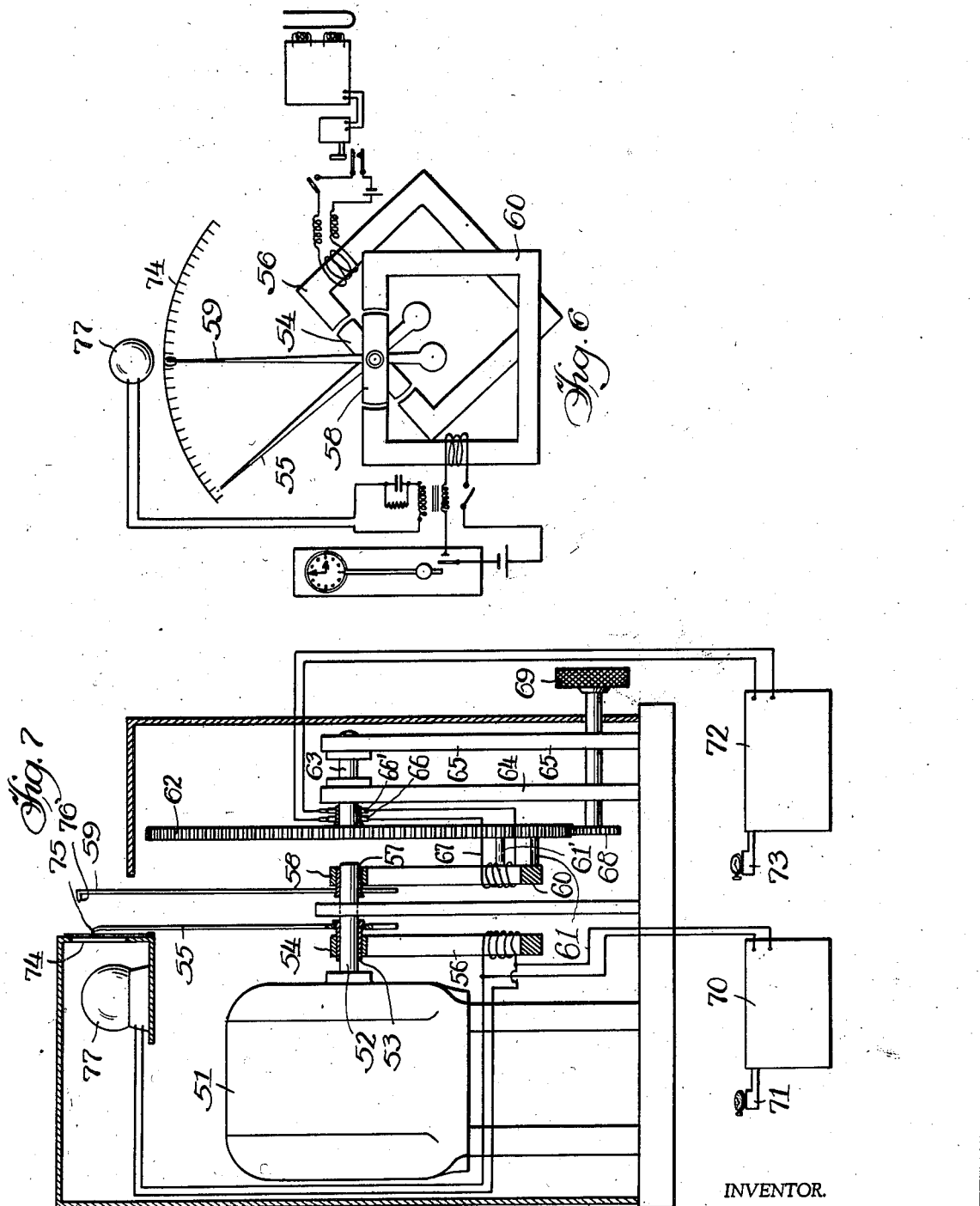

Feb. 9, 1943.   E. NORRMAN   2,310,706
APPARATUS FOR COMPARING THE RATES OF REGULARLY RECURRING IMPULSES
Filed April 16, 1941   3 Sheets-Sheet 3
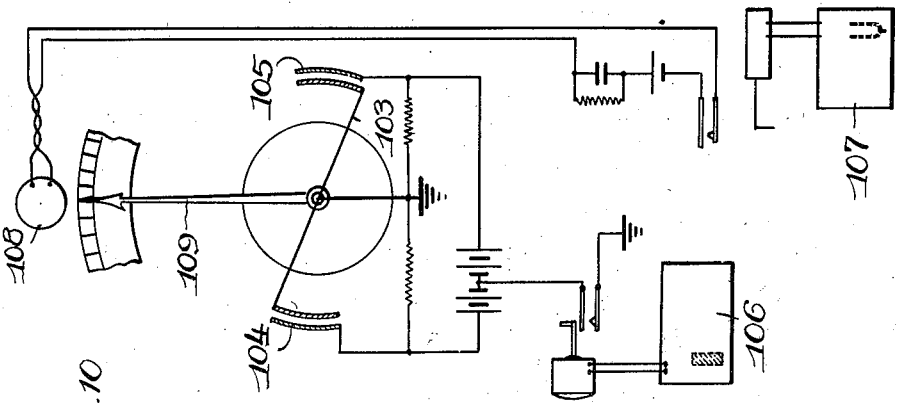
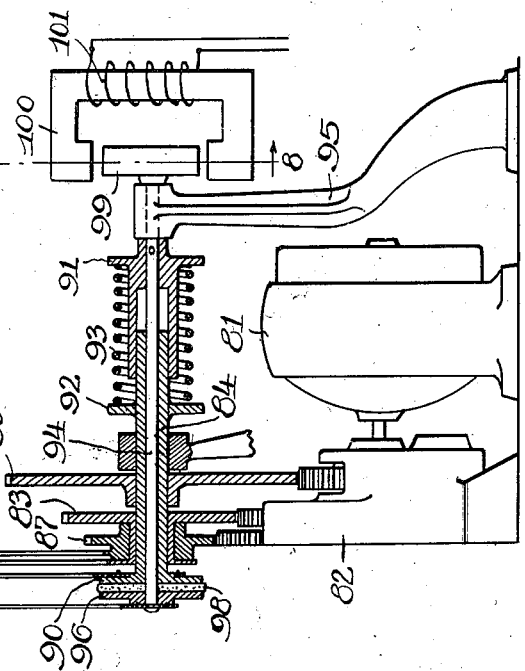
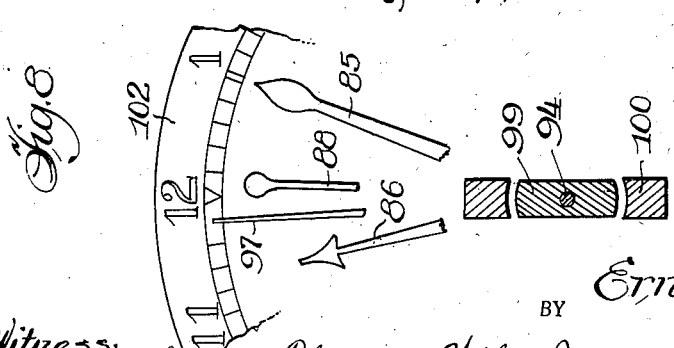
INVENTOR.
Ernst Norrman,
BY
Critton, Wiles, Davies & Hirschl, Attys.

Patented Feb. 9, 1943

2,310,706

UNITED STATES PATENT OFFICE 2,310,706

APPARATUS FOR COMPARING THE RATES OF REGULARLY RECURRING IMPULSES

Ernst Norrman, Delavan, Wis.

Application April 16, 1941, Serial No. 388,910

2 Claims. (Cl. 73—52)

This invention relates to improvements in apparatus and methods for comparing the rates of regularly recurring impulses derived from different sources and for determining the phase relation and measuring the frequency of such impulses.

One object of the invention is to provide apparatus of this character in which is included a movably mounted electromagnet having an armature, with means to rotate said armature continuously and means for periodically, momentarily energizing the electromagnet to cause the same to tend to align itself with the rotating armature, whereby the resulting movement of said electromagnet gives the desired indication.

Another object is to provide apparatus of this character in which two electromagnets are employed, each having its own rotating armature and pointer frictionally mounted on a shaft driven at constant speed, whereby one of said pointers, as it rotates, may show an angle of lead or of lag with respect to the other pointer, indicating a phase relationship between the sources of periodic currents energizing said electromagnets.

Another object is to provide apparatus for similar purposes, in which the relatively rotating parts which provide the corrections, are moved relatively to each other by electrostatic impulses, or by means other than an electromagnet.

Other objects will appear from the description which follows.

The invention may be embodied in numerous forms and is useful in various classes of service, including the testing of a watch as compared with a master chronometer and checking the accuracy of the phase differences of the timing mechanism of an internal combustion engine.

In the accompanying drawings several embodiments of the invention are shown.

Fig. 1 is a sectional elevation, somewhat diagrammatic, taken through apparatus illustrating the invention, in which an armature, driven by a motor, rotates between the poles of a rotatably mounted electromagnet, which latter usually moves back or forth through an angle less than 360°;

Fig. 2 is a section on the line 2—2 of Fig. 1, with certain parts omitted;

Fig. 3 is a sectional elevation, also somewhat diagrammatic but more detailed, of a form of the invention in which two electromagnets are employed, both of which receive the correcting impulses;

Fig. 4 is a diagrammatic view of apparatus employing electrostatic means for energization of the indicating member;

Fig. 5 is a section on the line 5—5 of Fig. 4;

Fig. 6 is an elevation, somewhat diagrammatic, of another form of the invention;

Fig. 7 is a side elevation thereof on a slightly larger scale with different external circuit connections, and with one electromagnet adjusted with respect to the other;

Fig. 8 is a fragmentary front elevation of a further form of the invention;

Fig. 9 is a more complete sectional elevation thereof; and

Fig. 10 is a diagrammatic showing of a further modification.

In Fig. 1 a substantially constant speed electric motor 1 is shown, as for example a synchronous motor, which rotates a shaft 2, mounted in suitable bearings, and which carries an armature 3 which rotates between the pole faces of a suitable electromagnet 4. Said electromagnet is fixed to the shaft 5 which is supported in suitable bearings independently of the first mentioned shaft 2 so that it may move one way or the other when it is energized momentarily. The motor housing may contain gears to reduce the speed of the shaft 2 so that the rotation of the armature 3 is at a predetermined rate, which will be in approximate synchronism with the impulses which energize the electromagnet. If, for example, the circuit to the electromagnet is closed once per second, then the speed of the shaft might be one-half, one, two, etc. revolutions per second. Thus the armature 3 would be in the same position each time the electromagnet 4 is energized and said electromagnet would not move from its position. If, however, the frequency with which the circuit is closed is fast or slow, then said electromagnet will move a small amount about its axis of rotation, one way or another.

The shaft 5 is normally held against rotation by an adjustable friction brake 6, the pressure of which is comparatively light and is regulated by the nut 7. Thus the electromagnet remains in the position to which it has been moved and without overrunning. A dial 8 is provided and a suitable pointer 9 is mounted on the shaft 5 to move over said dial and thus give a reading of the angular position of the electromagnet.

The impulses are supplied to the electromagnet from any one of a number of suitable sources of current controlled, for example, by a switch 10. The impulses may be provided by a quartz crystal amplifier, for example, or by a tuning fork amplifier, as explained more in detail in connection with Fig. 3.

One advantage of an arrangement in which the armature rotates whereas the field remains practically stationary or else moves in one direction or the other through angles less than a complete turn, is that no special arrangements need be made to conduct current to the windings of said electromagnet such, for example, as slip rings which would be necessary if the said electromagnet rotated continuously. The flexible leads shown in the drawing are sufficient to permit the necessary movement. If said electromagnet starts to rotate and requires to be brought back to zero before it has made a complete revolution, such return movement is permitted by the flexible conductors. The friction brake 6 should be carefully adjusted to prevent overthrow and to insure that the electromagnet will align properly with the armature upon each energization of said magnet.

In Fig. 3 a motor 11 drives the shaft 12 mounted in suitable bearings 13 and having an electromagnet 14 mounted thereon to rotate therewith. For convenience said electromagnet is referred to herein as the armature. A second electromagnet 15 is mounted on a second section or an aligned shaft 16 which is rotatably mounted on a suitable support 17. This second magnet, for convenience, may be called the field, although in practice the field and the armature may be practically identical in appearance. A friction device 18 and adjusting nut 19, similar to those previously described, are also provided, as is a graduated scale 20 and a pointer 21, the latter being mounted on the shaft 16 so as to indicate the rotative movement of the field.

The windings of the electromagnet 14 or armature are connected to slip rings 22, 22', mounted on but insulated from the shaft 12. The windings of the electromagnet 15, or the field, are connected to slip rings 23, 23' on the shaft section 16. Said windings may be connected either in series or parallel to the windings of electromagnet 14, the latter arrangement being shown on the drawing, and both sets of windings are connected to a suitable source of current such as a battery 24.

The means for furnishing the brief impulses include the pendulum 25 of an accurate clock, which pendulum, at one end of its swing, closes contacts 26, thus permitting current to flow from the battery through switch 27 and through the condenser 28, both sets of slip rings, both sets of windings of the electromagnets and thence back to the battery. Resistance 29 is of high value and therefore no appreciable current will flow after said condenser has been charged. Thus the energizing impulse becomes very brief. During the time that the contacts 26 are open, said condenser 28 has ample time to discharge. The brief energizing impulse in electromagnets 14 and 15 cause the armature and the field magnet to align with each other. However, as the armature rotates, the field magnet may remain in its original position or it may be moved slightly from such initial position one way or the other.

The motor 11, which is preferably a synchronous motor, may be supplied with current regulated by a tuning fork 30, the current developed by the vibrations of which are amplified by a suitable amplifier 31.

Suitable gears (not shown) in the motor housing may be used to reduce the speed of the shaft in this case also, so that the rotation of the electromagnet 14 is in synchronism with the pendulum 25, when the rate of the tuning fork 30 and of the pendulum are exactly the same. If the rate of the tuning fork is the same as that of the pendulum clock, then electromagnet 14 would be in the same position each time it is energized during its rotation, and the electromagnet 15 will not move from its position. If, however, after the initial line-up of the hands, the rate of the tuning fork is fast or slow with respect to the pendulum clock, then the motor will run fast or slow and the electromagnet 14 will be in lead or lag position with respect to the electromagnet 15 at the instant of each successive energization, and said electromagnet 15, i. e., the so-called field magnet, will be moved correspondingly upon each swing of the pendulum. Also, the hand 21 will move over the adjacent scale 20 at a rate corresponding to the difference between the rate of the tuning fork and the pendulum clock.

The switch 27, instead of being connected to said pendulum clock, may be used to supply impulses from another source, as for example that shown at the right hand end of Fig. 3. This alternative source comprises a quartz crystal 32 and an amplifier 33 which operates a motor 34. The motor shaft is geared down to a suitable speed and carries a cam arm 35, which, during each rotation of the shaft, closes the circuit of the contacts 36, the circuit from the battery to the electromagnet windings being the same as before, when the switch 27 is thrown to the other of its two positions.

An important advantage of the mechanism shown in Fig. 3, in which both the armature and the field are energized simultaneously, is that a definite polarity is established which causes said armature and field to repel or attract each other, depending on the relative position of said members at the time of the initial energization. Thus the armature and field can assume only one position with respect to each other, whereas in the case of arrangements such as shown in Fig. 1, either of two positions, 180° apart, may be assumed.

Another advantage of using an electromagnet for the armature as well as for the field is that the force available, i. e., the turning moment, is much greater and hence is more effective in overcoming the frictional resistance. Also, a greater friction may be applied initially by means of the friction brake to prevent any possible overthrow since such increased friction is readily overcome by the increased turning moment.

Many of the details described in connection with the apparatus of Fig. 3 may obviously be used also with the apparatus of Fig. 1, which latter is shown in more simplified form.

To enable the pointer 21 to be set at zero at the beginning of the operation, the motor 1 is preferably adjustably mounted having a gear 37 secured thereto which may be rotated by a pinion 38 on a shaft 39 with a knurled disc or thumb screw 40 also mounted thereon. By turning the thumb screw the motor and the electromagnet can be rotated and thus the hand 21 brought to any desired starting point with respect to the scale.

Figs. 4 and 5 show an electrostatic arrangement as alternative to the electromagnetic means shown in Figs. 1 and 3. The motor 41 and certain related parts 42—47, correspond to those previously described except that rotatable insulating discs 43 and 44 each support segments of metal cylinders 48, 48' and 49, 49', shown cross connected and in concentric arrangement in Fig. 5. If a relatively high voltage is applied to the two groups of segments, the electrostatic force tends to cause the segments to line up with each other similarly to the effect of the magnetic field produced in the apparatus of Figs. 1 and 3. The source of current supply and the circuit closing device may be substantially the same as that previously described.

Referring to the next modification shown in Figs. 6 and 7, two electromagnets are shown arranged adjacent to each other in parallel planes each having an armature driven by a suitable motor 51. The motor shaft 52 has a friction sleeve 53 thereon to which is non-rotatably secured the armature 54 and the pointer 55. Said armature is influenced by an electromagnet 56.

In like manner a second friction sleeve 57 is mounted on the same shaft 52 and has an armature 58 non-rotatably secured thereto, carrying a pointer 59. Also, an electromagnet 60 is mounted adjacent said armature. Said sleeves are so adjusted that there is no slippage between them and the shaft, under normal conditions, when the latter rotates but if said armatures are held against rotation, said shaft will turn with respect to said armatures.

Said electromagnet 60 is supported by suitable studs 61, 61' in a disc 62. Said disc is mounted on the shaft 63, the latter being supported in bearings in upright supports 64, 65. Slip rings 66, 66' are also mounted on said shaft with appropriate conductors 67 extending to the coils of the magnet. The disc 62 may have gear teeth cut therein to mesh with the pinion 68, actuated by a knurled knob 69, or a friction disc may be used instead of the pinion.

The purpose for this adjustment of one electromagnet with respect to the other is to make it possible to move the two pointers 55 and 59 into registration with each other, i. e. with the two hands exactly in line, as later explained more fully.

The electromagnets 56 and 60 are energized from any suitable source of impulses, which sources may be different. For example, said impulses may be generated by clocks, watches, a cam on a motor shaft making or breaking a contact, commutators, etc. In Fig. 6, for example, one source may be a tuning fork the vibrations of which are amplified, the output of the amplifier driving a synchronous motor which, in turn, closes suitable contacts once during each revolution. This device has already been described in connection with Fig. 3 and such description need not be further enlarged. The other source also has already been described and will be recognized as consisting of a pendulum clock equipped with contacts which close once during each complete swing of the pendulum.

In Fig. 7, which is on a larger scale than Fig. 6, the electromagnet 56 is energized by the output impulses from the amplifier 70, which has a microphone 71 to receive a standard watch or master watch. The other electromagnet 60 is energized by the output impulses from amplifier 72 which has a microphone 73 for the watch to be tested.

The operation, when a watch is being tested, is as follows:

When the motor is put in operation, its speed is regulated to the desired value, that is, approximately in synchronism with the frequency of the impulses that are to be timed. The pointers 55 and 59 are turned round and round at the speed of the motor shaft on which they are mounted and the angle between the hands will remain whatever it was at the start. Assuming, for illustration, that a watch is to be tested, the master watch amplifier 70 is put into operation and the electromagnet 56, with which it is connected, will thus be energized at every tick of the master watch 71. The magnetic force between the poles of said magnet will pull the armature 54 into line with its poles during the short intervals when said electromagnet is energized. If said armature should happen to be considerably out of line with the poles of the magnet at the first impulse, it may not be pulled completely into line with said poles at the first impulse but after a series of such impulses it will assume the proper angular relation by moving slightly with respect to the rotating shaft on which its supporting sleeve is mounted.

The motor should run at approximately the correct speed so that between each tick of the master watch, which may be assumed to be one-fifth of a second, the armature leads or lags only slightly. If the speed of the motor is slightly too high, the armature may, for instance, be three degrees out of line with the poles of the magnet at the moment the impulse becomes effective, in which case said armature will be pulled back three degrees. If the motor were running too slowly, the armature would lag and would be pulled forwardly, due to the correcting impulse.

The operation of the portion of the device used in connection with the watch to be tested is the same, as will be apparent. Assume, for example, that both of the electromagnets 56 and 60 are mounted exactly in line, with the two pointers 55 and 59 in registration. If the master watch and the watch to be tested are exactly in beat, the armatures will line up at the same instant and the hands will then follow each other around as both of them rotate.

Assuming now that the watch to be tested begins to gain a little, this results in a little shorter interval between the ticks of said watch and between the ticks of the master watch and causes the ticks of the tested watch to come a little further and further ahead of the master watch. Thus there will be an angular difference between the pointers 55 and 59 with the hand 59 leading the other hand. If the watch under test were slow, said hand 59 would lag behind the hand 55.

In case both watches should not be in beat when the test starts, which is frequently the case, the two pointers will start out at an angle to each other. Assume also that the motor makes a complete rotation in one-fifth of a second (between two successive ticks of the master watch) and that the watch under test is in such a phase to the master watch that it ticks one-twentieth of a second ahead of it. The result is first that the watch under test lines up the hand 59. Then, one-twentieth of a second later when said test watch hand has traveled ninety degrees, the master watch lines up hand 55. If the watches are running at the same rate, this will happen every time and the angle of ninety degrees will be maintained. If the watch under test gains, the angle will increase. If it loses the angle will decrease.

When the apparatus is first put into operation and it is found that the hands are not in registration, the magnet 60 is rotated to such a position that registration does take place. It will be apparent that said magnet can be turned to such a position that the hands will line up no matter what the difference between the two phases of the watches may be. If the hands stay together, both watches are running at the same rate. If the pointer 59 of the watch under test gains on the pointer 55 of the master watch system, the watch under test is fast. If said hand 59 lags, the watch under test is slow. To ascertain exactly how fast or slow the watch under test may be, a suitable scale 74 is provided. Said scale may consist of a removable, printed sheet and the hands may have sharp projections 75, 76 thereon, as shown in Fig. 7, and by this means marks may be made on the paper scale by pressing the sharp points against or into said scale.

The faster the motor runs the faster a perceptible angle will build up between the hands for a certain difference in rate between the watches. There are practical limitations for the speed of the motor. For instance, if said speed is too far off from a speed synchronizing with the ticks of the watches, the hands will not be properly corrected. With light and well balanced hands a speed of five R. P. S. can easily be used. In this case the armature will be a straight bar. The armature will make approximately one revolution between two successive ticks of a five beat watch. Thus the same end of the armature will always be pulled to the same magnet pole. If the speed of the motor is two and one-half revolutions per second the armature will make half a revolution between ticks. Thus also in this case a straight bar armature should be used. If the motor makes one revolution per second the armature turns one-fifth of a turn between successive ticks and a five pole armature should be used, etc.

At a speed of one R. P. S. the angle between the two hands can be seen very easily and fairly accurately estimated while the hands are running. At two and one-half R. P. S. it can easily be determined in what direction the hand operated by the tested watch is drifting in respect to the hand operated by the master watch. If it is desirable to accurately read the angle the motor may be stopped and the correction impulses broken simultaneously by a suitable switch. The hands will remain at the angle which they assumed during rotation.

As an auxiliary arrangement for reading the angle between the hands while in motion, a neon lamp giving short, sudden flashes may be used. In Fig. 7 this lamp 77 is shown as operated from the same amplifier as the standard watch corrector magnet 56. Said lamp could, however, be operated from the test watch amplifier, from a cam contact on the motor shaft or in numerous other ways, as shown in some of the drawings previously described. One example is the pendulum control shown in Fig. 6. The main aim is to obtain a sharp flash of short duration. When operated by the master watch the advantage is gained that the flash always occurs (or can be made to occur) when the master watch controlled hand is up. In this case the lamp can be mounted behind a scale 74 having transparent gradings.

This detailed description of the testing of a watch presents merely one of a large number of uses for the apparatus, the general operation of the apparatus being the same regardless of the source of the impulses. In any case, the angle between the pointers depends on the phase difference between the impulses energizing the two electromagnets. If the rates of said impulses are exactly the same, said pointers will maintain this angle indefinitely. If, however, the rates of the impulse sources are different, the angle between the hands will change. In general, if the rate of the impulses from one source is to be measured, it is advantageous to be able to bring the pointers together at the start of the timing. This is accomplished by virtue of the adjustable mounting of one of the magnets, as shown in Fig. 6. If the hands stay together during operation of the instrument, then the rates of impulses from the two sources are the same, otherwise not, in which case the hands during rotation begin to form an angle. After sufficient time has elapsed to present an angle large enough to be read on the scale, this change of angle may be observed for a certain period of time and thus the rate of one impulse source with respect to the other, can be computed.

The scale may be so graduated that it reads directly in time.

Another modification is shown in Figs. 8 and 9 wherein is illustrated an electric clock having an additional hand and correcting mechanism to cause said hand to be corrected at predetermined intervals, even though the usual hands of the clock do not rotate at exactly the proper rate. The clock mechanism is shown only partially and is intended to be typical of any one of a number of clock mechanisms. It includes a substantially constant speed motor 81 which drives the clock mechanism comprising suitable gearing enclosed in part in a gear housing 82 and arranged to rotate a gear 83 which is secured to a collar mounted on and fixed to the rotatable sleeve 84. A minute hand 85 is secured to said collar and thus turns with the gear 83. The usual hour hand 86 is mounted on another collar concentric with the first collar and has a gear 87 fixed thereto which is also driven by the said clock mechanism. A second hand 88 is also provided which is mounted on and turns with said sleeve 84, which may be considered the main shaft, and is rotated by a gear 89. Said sleeve 84 has a fixed flange 90 at one end with a telescopic sleeve section at the other end with a flange 91 thereon.

The flange 92 is also mounted on said sleeve with a coiled spring 93 between said flanges 91 and 92 which tends to press said flanges apart.

The sleeve 84 is rotatably mounted in a suitable bearing, shown only in part, and surrounds a shaft 94 which passes through and turns in a suitable bearing or support 95. At the outer end of said shaft is affixed another flange 96 and also an auxiliary hand 97 which turns with said shaft. A suitable friction washer, as for example a spring washer or felt washer 98, is confined between said flanges 90 and 96, resulting in a slight friction which normally causes the shaft 94 to turn with its concentric sleeve 84, unless restrained, as for example by periodic magnetizing impulses such as described in connection with the other figures of the drawings.

As thus far described, the clock may be any suitable electric clock having an hour hand, a minute hand and a second hand, with the addition of an auxiliary second hand 97 which may be assumed to be superimposed over or to register with the second hand of the clock and to turn therewith, performing no particular function.

To render said auxiliary hand effective, the inner end of shaft 94 has the flange 91 secured thereto against longitudinal movement thereon so that the pressure exerted by the coil spring 93 results in compressing the felt washer 98 between the adjacent flanges. If the flange 92 or 91 is made adjustable on the supporting sleeve in each case, said compression and hence the friction between the shaft 94 and the concentric sleeve 84 immediately surrounding the same, may be regulated to a nicety. Other means for adjusting said friction will readily suggest themselves.

As a further means for utilizing said auxiliary hand, the inner end of the shaft 94 has affixed thereto also the armature 99 which rotates between the poles of electromagnet 100, the winding 101 of which is connected to some suitable source of momentary energizing impulses such, for example, as a Riefler clock or any of the other sources previously described herein.

The armature 99 rotates with the second hand 88, being driven indirectly from the motor 81, much as in the figures previously described. The auxiliary hand 97 rotates with the hand 88, being superimposed thereover and remaining in registration therewith, due to the frictional connection. Said auxiliary hand is painted a distinctive color, as for example red, to readily distinguish it from any of the other hands of the clock.

Assuming that the rate of rotation of the motor is not exactly accurate, and that the hands of the clock vary accordingly, the periodic correcting impulses applied to the electromagnet 100 will cause the armature 99 to line up with the field poles at regular intervals during the rotation of said armature and the shaft on which it is mounted, overcoming the slight friction and causing the auxiliary hand to form a slight angle with the second hand of the clock as the two continue rotating. Thus said auxiliary hand will rotate in exactly equal intervals of time and the angular variation from the conventional second hand may be noted and used as an indication of the lack of accuracy in the rotation of the motor, all of which will be understood without a further detailed description. The usual clock dial 102 aids in making this reading.

The motor may be supplied with alternating current, controlled by a tuning fork. Hence one important use for an instrument of this character is to check the accuracy of the vibrations of tuning forks such as are used in certain special classes of commercial service where great accuracy is required, making it possible to change each tuning fork tested, as for example by filing off a little metal to increase the rate of vibration, or otherwise modifying the same to change its temper or hardness. The apparatus may thus be used to check a tuning fork against a Riefler clock or vice versa, or for checking many other sources of current involving regular impulses or frequencies.

Fig. 10 shows electrostatic means for operating the so-called armature, similar in general to what is shown in Figs. 4 and 5. Said armature 103 is affected by the two curved sectors 104, 105, connected in circuit with a source of impulses indicated generally at 106, and which will be understood without further description. The other source of impulses, which may be of the tuning fork frequency type 107, causes the neon lamp 108 to flash, as previously described. As will be apparent, the armature 103 will line up in the electrostatic field when a voltage is applied to the electrodes. By observing the apparent drift of the hand 109, the difference in rate between the two sources of impulses may be calculated.

Many of the features described in one form of the invention may be used in other forms thereof wherever applicable. The invention is not limited to the particular embodiments shown but changes may be made therein within the scope of the appended claims.

I claim:

1. Apparatus of the character described comprising in combination, a shaft, means to drive said shaft at a predetermined speed, an armature secured to said shaft to rotate therewith and having the form of an electromagnet, a second electromagnet rotatably mounted adjacent said armature, and means for connecting both of said electromagnets to a source of electrical impulses of brief duration, whereby said electromagnets tend to move into alignment when said impulses are effective.

2. Apparatus of the character described comprising a constant speed motor, an electromagnet mounted on the shaft thereof, a second shaft in alignment with the first shaft and having an electromagnet mounted thereon, slip rings on said shafts for said electromagnets, and friction means tending to maintain said second shaft in its normal position, means for applying impulses of brief duration to said electromagnets, to cause said second electromagnet to be influenced by said first electromagnet while the latter is rotating, and an indicator associated with said second electromagnet.

ERNST NORRMAN.